United States Patent
El Fassi et al.

(10) Patent No.: US 10,618,536 B2
(45) Date of Patent: Apr. 14, 2020

(54) METHOD AND SYSTEM FOR MANAGING SPECIFIC EVENTS RELATED TO THE MOVEMENTS OF A GUIDED VEHICLE

(75) Inventors: Said El Fassi, Vigneux sur Siene (FR); Clara Nogueira Alves, Issy les Moulineaux (FR)

(73) Assignee: Siemens Mobility S.A.S., Chatillon (FR)

( * ) Notice: Subject to any disclaimer, the term of this patent is extended or adjusted under 35 U.S.C. 154(b) by 693 days.

(21) Appl. No.: 13/637,529

(22) PCT Filed: Apr. 28, 2010

(86) PCT No.: PCT/EP2010/055740
§ 371 (c)(1),
(2), (4) Date: Oct. 25, 2012

(87) PCT Pub. No.: WO2011/116837
PCT Pub. Date: Sep. 29, 2011

(65) Prior Publication Data
US 2013/0046421 A1 Feb. 21, 2013

(30) Foreign Application Priority Data
Mar. 26, 2010 (EP) ..................................... 10290159

(51) Int. Cl.
*B61L 27/04* (2006.01)
*B61L 3/12* (2006.01)
(Continued)

(52) U.S. Cl.
CPC ............... *B61L 27/04* (2013.01); *B61L 3/127* (2013.01); *B61L 23/041* (2013.01); *H04L 67/125* (2013.01)

(58) Field of Classification Search
None
See application file for complete search history.

(56) References Cited

U.S. PATENT DOCUMENTS

| 5,549,365 A | 8/1996 | Vernier et al. |
| 2004/0245410 A1* | 12/2004 | Kisak et al. .................... 246/3 |

(Continued)

FOREIGN PATENT DOCUMENTS

| CN | 101009679 A | 8/2007 |
| DE | 19652588 A1 | 6/1998 |

(Continued)

OTHER PUBLICATIONS

Müller R et al.: "Deutschlands erste automatische U-Bahn sicher and Zuverlässig im Fahrgastverkehr (Germany's first automated Metro is safe and reliable in passenger operation)", Zevrail—Glasers Annalen, Georg Siemens Verlag, Berlin, DE, vol. 134, No. 3, Mar. 1, 2010 (Mar. 1, 2010), pp. 86-95, XP001551914, ISSN: 1618-8330, p. 93, col. 1—p. 3; figure 11—English abstract.

(Continued)

*Primary Examiner* — Lail A Kleinman
(74) *Attorney, Agent, or Firm* — Laurence Greenberg; Werner Stemer; Ralph Locher

(57) ABSTRACT

A method and a system manage a specific event related to the movement of a guided vehicle. The system for managing a specific event includes a remote control module and a remote control station for remotely controlling the guided vehicle upon a command, to the remote control module from the remote control station, to switch from a normal driving mode to a remote driving mode.

15 Claims, 1 Drawing Sheet

(51) Int. Cl.
*B61L 23/04* (2006.01)
*H04L 29/08* (2006.01)

(56) References Cited

U.S. PATENT DOCUMENTS

| | | |
|---|---|---|
| 2005/0091593 A1 | 4/2005 | Peltz |
| 2005/0119801 A1* | 6/2005 | Florentin ............ G05D 1/0022 |
| | | 701/2 |
| 2005/0125113 A1* | 6/2005 | Wheeler et al. ................ 701/19 |
| 2009/0186325 A1* | 7/2009 | Kumar .................... B61C 17/12 |
| | | 434/219 |

FOREIGN PATENT DOCUMENTS

| | | | |
|---|---|---|---|
| DE | 197 43 306 A1 | 4/1999 | |
| DE | 10 2007 010 867 A1 | 9/2008 | |
| DE | 102007010867 A1 * | 9/2008 | ............. B61L 3/127 |
| EP | 0 849 138 A1 | 6/1998 | |
| KR | 100369759 B1 | 5/2003 | |

OTHER PUBLICATIONS

Fujiwara, Masahiro et al.: "Full-Automatic Operation System for Nanakuma Line Subway in Fukuoka"; Hitach Review, 2005; pp. 185-192.
Akerstroms, "Remote Controlled Locomotives 1000 Meters Underground" May 27, 2010, [http://www.akerstroms.com/fr/locomote/lkab_1107#REMOTE%2000NTROLLED%2OLOCOMOTIVES], 2010.

* cited by examiner

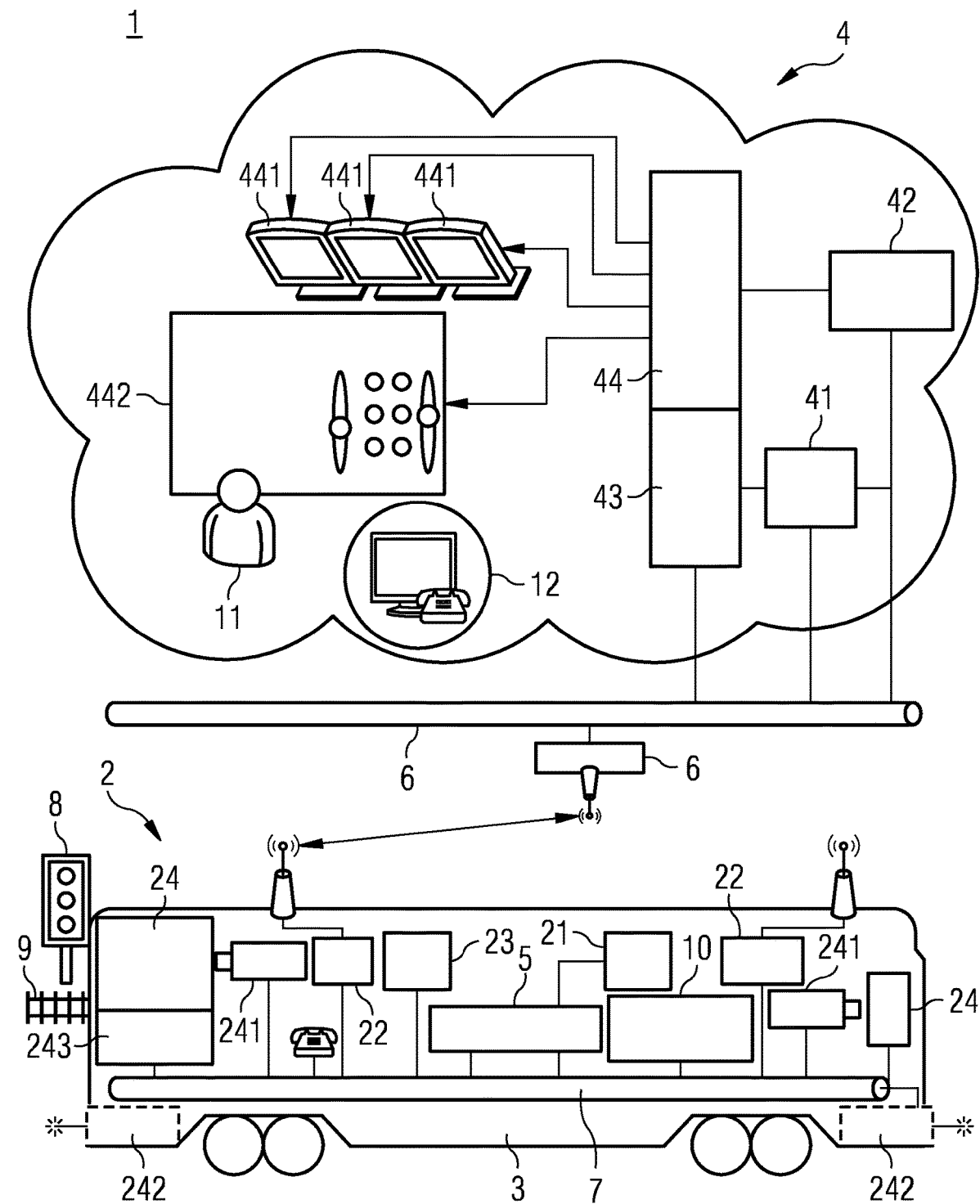

METHOD AND SYSTEM FOR MANAGING SPECIFIC EVENTS RELATED TO THE MOVEMENTS OF A GUIDED VEHICLE

BACKGROUND OF THE INVENTION

Field of the Invention

The present invention relates to a method and a system for managing at least one specific event that may occur during a movement of a guided vehicle, that is in particular able to disturb said movement of the guided vehicle, according to the preambles of the claims.

"Guided vehicle" refers to public transport means such as buses, trolleybuses, streetcars, subways, trains or train units, etc., as well as load-transporting means such as, for example, overhead travelling cranes, for which safety is a very important factor and which are guided specifically by at least one rail that defines at least one transport track or line, i.e. at least one path for said transport means.

In particular, the invention relates to the railway domain, in particular to entirely automatic transport means, as well as transport means fitted with a control system based on remote communication, for example trains fitted with a radio train control system, commonly referred to as "communication-based train control" (CBTC). Said management of specific events relates in particular to the intervention of intervention staff in response to operating irregularities of a guided vehicle or of a transport line at the site of said irregularity, or during specific maneuvers of a guided vehicle requiring the intervention of qualified staff. Said intervention is intended in particular to rectify a temporary outage of the guided vehicle or of the transport line.

Driving automatic guided vehicles, such as a fully automatic subway, usually involves three key subsystems. A first subsystem, known as an on-board subsystem, moves the guided vehicle safely and protects passengers and ground staff. A second subsystem, known as a ground subsystem, is able to locate the guided vehicle during the movement thereof (land location of all guided vehicles during movement) and to guarantee the safe movement thereof, in particular in relation to the movement of at least one other guided vehicle that can also be located by said ground subsystem. Finally, a third subsystem, known as a data transmission subsystem, enables permanent communication between the guided vehicle and the fixed equipment on the ground located beside a transport track of the guided vehicle.

Different driving modes may also be used to drive the guided vehicle as a function of the situation on the transport line and operation of the equipment designed to enable the movement of said guided vehicle, but also as a function of instructions ordered from a centralized control station (PCC). In particular, an entirely automatic driving mode, also known as "unattended train operation", is the driverless driving mode.

This driverless driving mode, or automatic driving, in particular makes it possible to improve regulation of guided vehicles by enabling the guided vehicle to be piloted substantially free from any intervention by the driver thereof. This driving mode makes it possible, for example, to set an optimal movement speed of said guided vehicle, and thereby to improve the performance of a transport line.

However, such a driverless driving mode cannot deal with all of the events that may occur during use of the guided vehicle. Therefore, in the occurrence of certain specific events detailed below, intervention staff, such as a driver, need to board the guided vehicle in order to manually pilot said guided vehicle. This manual driving of the guided vehicle may have a limited top speed or be unlimited, for example, by monitoring the behavior of the intervention staff. This manual, on-sight driving is a degraded driving mode of the driverless driving mode of the automatic guided vehicle.

Manual driving of a guided vehicle able to operate in a driverless driving mode may also be used by intervention staff in response to other specific events occurring in particular outside the CBTC domain, for example in a workshop zone, or on a test track of the guided vehicle. This manual driving mode is sometimes required in the event of exceptional breakdowns. It makes it possible for example to withdraw a train from a service of a guided-vehicle track network if a fault prevents continuation of automatic driving. It also enables trains to pass through zones where the automatic driving mode is temporarily unusable. In these cases, the safety of the guided vehicle and of the occupants or load thereof is guaranteed by the intervention staff on board the guided vehicle and application of operating procedures, for example using exchanges with the PCC.

In particular, changing the automatic driving mode for a manual driving mode is necessary in the following situations corresponding, without limitation, to specific or irregular events that may occur during a movement of said guided vehicle:

Failure of on-board PLC equipment,
Failure of stationary PLC equipment managing a stretch of a transport line,
Delocalization of the guided vehicle, such as the loss of localization of a position of the guided vehicle in a reference system having one or more positions of the guided vehicle,
Loss of control of safety loops of the guided vehicle, for example a door-locking failure in the guided vehicle, or an impact of the front of the guided vehicle with an obstacle, etc.

In general, a specific event according to the present invention is an event resulting in a situation requiring an external intervention on the guided vehicle by intervention staff at the site where said event has occurred. The event may for example be a malfunction of one of the on-board devices, resulting in a breakdown of the guided vehicle requiring the intervention of a driver in order to pilot said guided vehicle manually.

Thus, the aforementioned specific events currently require intervention staff, such as a driver, to be sent to the location of the guided vehicle in order to manually pilot the guided vehicle in manual driving mode. Generally, guided vehicles are driven manually by said intervention staff from an end console of the guided vehicle. Depending on the duration of the intervention by the intervention staff, said specific event may for example disturb the flow of traffic on a transport line or cause more or less serious incidents due in particular to impatience among passengers deciding to alight from the guided vehicle.

BRIEF SUMMARY OF THE INVENTION

One object of the present invention is to propose a method and a simple, safe and reliable device for managing specific events that may occur during use or movement of a guided vehicle that may have a detrimental effect on the availability of said guided vehicle or of a transport line, said method and said device being ideally easily adaptable to any type of rail-guided vehicle.

Another object of the present invention is in particular to reduce the downtime of the guided vehicle or of the transport line caused by specific events, or to remedy the unavailability of the guided vehicle, without diminishing the safety level of said guided vehicle.

For this purpose, a device and a method are proposed by the content of the claims. A set of sub-claims also sets out the advantages of the invention.

On the basis of a method for managing a specific event that could disturb a movement of a guided vehicle, in particular an automatic guided vehicle, said management method including detection of at least one specific event, the management method according to the invention is characterized by:
- a switching from a driving mode of said guided vehicle, in particular a switching from a normal driving mode that can be implemented by a normal piloting system of said guided vehicle to a remote driving mode that can be implemented by a remote piloting module of said guided vehicle, said switching being controllable remotely following detection of said specific event, in particular, said switching being remotely controllable by a remote-controlled device of a remote control station of the remote piloting module, said remote piloting module being in particular integrable into the guided vehicle, and said switching also being reversible, in particular in the event of reception of a signal marking the end of said specific event,
- the real-time measurement and collection of piloting data relating to the piloting, operation and an external and internal environment of said guided vehicle in the remote driving mode,
- the real-time communication of said piloting data between the remote piloting module of said guided vehicle and the remote control station, which is in particular mobile or integrable into a centralized control station located remotely in relation to said guided vehicle,
- the real-time processing of said piloting data from said guided vehicle to enable a remote manual piloting of said guided vehicle in remote piloting mode,
- the real-time remote manual piloting of said guided vehicle in the remote driving mode, in particular using said remote control station which is able to cooperate with said remote piloting module, on the basis of said piloting data of said guided vehicle.

The present invention also discloses a remote piloting module for a guided vehicle that can be carried on board a guided vehicle having a normal piloting system used to pilot said guided vehicle, in particular, said normal piloting system is an on-board driverless automatic piloting system on board said guided vehicle, said remote piloting module according to the invention is characterized in that it can cooperate with the normal piloting system of said guided vehicle to enable said guided vehicle to be operated manually and remotely, and includes, in order to implement this cooperation:
- A system for switching from one driving mode of the guided vehicle, that can be remotely controlled, i.e. from a location away from said guided vehicle, in particular in the event of detection of a specific event, by a remote control station, in order to remotely switch a normal driving mode to a manual remote driving mode and vice versa, said switching system therefore being able to switch a normal driving mode of the guided vehicle that can be implemented by the normal piloting system, which is in particular automatic, to a remote driving mode of said guided vehicle, and vice versa, said remote driving mode corresponding in particular to the remote manual piloting of said guided vehicle,
- An on-board communication system, between the guided vehicle and the remote control station, that is able to exchange, i.e. to send and receive, in the remote driving mode, with a communication system of said remote control station, piloting data relating to the piloting, operation and an internal and external environment of said guided vehicle, said piloting data being implementable using said remote driving mode, or in other words, said manual piloting of said guided vehicle, and including in particular information, commands or parameters relating to the piloting, operation and an internal and external environment of said guided vehicle,
- An on-board system for processing said piloting data is able to process said piloting data to enable the remote manual piloting of said guided vehicle in the remote driving mode,
- Means for remotely piloting said guided vehicle that can be controlled manually, in particular using said piloting data, using commands from the remote control station in said remote driving mode. Said piloting means thereby enable the remote manual piloting of said guided vehicle in the remote driving mode. Furthermore, said remote piloting means are in particular able to measure and collect piloting data, and to send this data to the on-board processing system to be sent to the remote control station. For this piloting data collection and measurement, the piloting means include in particular devices for measuring, collecting and capturing piloting data relating to the piloting, operation and an internal and external environment of said guided vehicle, such as for example driving or surveillance cameras.

The present invention also proposes a remote control station of a remote piloting module of a guided vehicle, said remote piloting module being installable on board said guided vehicle comprising a normal piloting system, being in particular automatic, and said remote control station according to the invention being characterized in that it can remotely control the piloting of said guided vehicle using said remote piloting module, and in that it includes:
- A device for remotely controlling a switching system of the remote piloting module, said switching system being in particular able to switch a driving mode of the guided vehicle in response to a command issued from the remote-control device, enabling in particular a switching from a normal driving mode that can be implemented by the normal piloting system, being in particular automatic, to a remote driving mode of said guided vehicle, and vice versa, said remote driving mode corresponding in particular to a remote manual piloting of said guided vehicle. Said remote-control device is therefore able to remotely control, i.e. from a location away from said guided vehicle, a switching from a remote driving mode, being in particular manual, to a normal driving mode, and vice versa,
- A communication system between the guided vehicle and the control station that is able to exchange, i.e. to send and receive, in the remote driving mode, with an on-board communication system of the remote piloting module of said guided vehicle, piloting data relating to the piloting of said guided vehicle, said data enabling in particular the implementation of remote manual piloting of said guided vehicle and including in particular information, commands and parameters relating to the operation, piloting and an internal and external environment of said guided vehicle, A system for processing said piloting data of the guided vehicle is able to process said piloting data to enable the remote manual piloting of said guided vehicle in the remote driving mode, Remote manual control means able to control the remote piloting means of the remote piloting module of the guided vehicle in the remote driving mode, to enable, on the basis of said piloting data, the remote manual piloting of said guided vehicle in the remote driving mode.

The present invention also proposes a specific-event management system including said remote piloting module installable on board said guided vehicle, and said remote control station of the remote piloting module, said remote control station being for example integrable in an existing centralized control station. Said remote piloting module and said remote control station are able to cooperate with each other, as well as with an existing normal piloting system fitted in the guided vehicle, in order to implement the remote piloting of the guided vehicle, in particular following detection of a specific event.

Following specific events, such as a failure of a device of the guided vehicle, the normal piloting system able to implement the normal driving mode of said guided vehicle is then unable to continue piloting said vehicle. The normal driving mode is in particular an automatic driving mode requiring no driver intervention. Therefore, in the event of failure, it is necessary to implement the remote driving mode enabling intervention staff to manually pilot said guided vehicle remotely from said remote control station able to control the piloting of said vehicle using said remote piloting module, which can be fitted to the guided vehicle. It is noted that the normal piloting system refers to the means and devices used for the normal driving of the guided vehicle, i.e. driving that can be managed from inside said guided vehicle, or managed automatically by the guided vehicle and the normal piloting system thereof, or managed by a driver on board the guided vehicle, when the remote driving mode requires the piloting of the guided vehicle to be managed remotely or from outside the guided vehicle. The switching between one or other of the driving modes of the guided vehicle being in particular commanded from the remote control station. The piloting of said guided vehicle is then managed from the remote control station by intervention staff manually and remotely controlling the piloting of the guided vehicle in particular using remote manual commands provided by the remote control station.

The present invention advantageously enables the remote deployment of a driving station of the guided vehicle to a central control station (PCC) incorporating the remote control station, while retaining a level of safety equal to manual on-sight driving of said guided vehicle by maintenance staff using a driving station on board said vehicle. This has the advantage of limiting the impact of intervention times on line availability.

The present invention thereby enables remote driving of a guided vehicle following occurrence of a specific event, by implementing a set of means enabling the guided vehicle to be driven remotely with a level of operational safety at least as safe as driving with intervention staff on board the guided vehicle. According to the present invention, the specific-event management system is based on two subsystems, the remote piloting module installable on board the train and the remote control station on the ground. On board the guided vehicle, the remote piloting means may for example include in particular external and internal video means, a remote deployment of surveillance and commands from the driving station and audio means. The remote control station can be used as a remote driving station. For this purpose, said remote manual control means can be arranged such as to create a PCC, a remote driving station for the guided vehicle similar to the on-board driving station, also including audio-visual means.

In particular, the remote piloting means are able to cooperate with the on-board processing and communication systems to guarantee transmission and reception of commands and indicators in the driving cab of the guided vehicle, while retaining the same level of safety. Furthermore, the remote manual control means include assisted-piloting means enabling the environment of a driving cab of a guided vehicle to be recreated, said environment being recreated for example on the PCC into which the remote control station is integrated.

This recreation of the environment of a driving cab of a guided vehicle requires in particular specific audiovisual means that can be incorporated into the remote piloting means. For this purpose, the remote piloting means may include devices for measuring and collecting piloting data, such as:

At least one driving camera positionable at each end of the guided vehicle, that can in particular be placed in the driving stations of the guided vehicle, At least one driving camera characterized by a field of view enabling re-creation of the field of view of an on-board driver in the driving station of the guided vehicle while said guided vehicle is being driven. In particular, said field of view advantageously enables the transport track, the track environment and the signaling beside the transport track to be seen, At least one surveillance camera located inside and/or outside said guided vehicle enables the environment of the guided vehicle to be checked and monitored, in particular the internal and/or external environment of said guided vehicle, as well as enabling information relating to said internal environment to be transmitted. In particular, said surveillance camera is able to send an image enabling a visual verification of an open or closed state of a door of the guided vehicle to at least one screen incorporated into said assisted-piloting means. Said visual check for example makes it possible to determine the nature of an alert relating to the failure to lock a door of the guided vehicle sent as piloting data by differentiating an open state of said door from a locking contact failure. Advantageously, the assisted-piloting means of the remote manual control means therefore make it possible to check the internal and external environment of the vehicle in order to help remote intervention staff to make decisions relating to piloting of the guided vehicle, in order to enable them, for example, to opt to override a closing failure of a door remotely.

The images captured by said cameras are in particular piloting data that can be transmitted in real-time to said assisted-piloting means of the remote manual control means. For this purpose, said images may be communicated in real-time by the on-board communication system, for example following processing by the on-board processing system, to the communication system of the remote control station, which is able to send said piloting data to the remote-control means, having first processed them using the processing system where necessary. Thus, the remote piloting means may include a system of on-board cameras making it possible in particular to check, from the remote control station, a set of safety points that must be acknowledged by intervention staff able to pilot the guided vehicle using said remote control station. Normal checks carried out by intervention staff on board the guided vehicle can therefore be performed remotely using said remote manual control means of the remote control station.

In general, the on-board processing and communication systems of the remote piloting module, as well as the communication and processing systems of the remote control station can cooperate with each other in order to send said piloting data, in particular, from the remote-control device to the switching system in order to switch a driving mode of the guided vehicle, and from remote piloting means to said remote manual control means, and vice versa, in order to enable the remote manual piloting of said guided vehicle. In particular, the piloting data can be sent in real-time via a communication network between the guided vehicle and the ground. For this purpose, the on-board communication system and the communication system of the remote control station can exchange said piloting data via said communication network.

The remote piloting module is also able to send identification parameters of the guided vehicle to the remote control station. Advantageously, said identification parameters of the guided vehicle enable the remote control station to identify one or more guided vehicles, each having a remote piloting module and being remotely pilotable by the same remote control station. To do so, remote intervention staff can select the guided vehicle to be piloted remotely using a guided-vehicle selection device that may be incorporated in particular into the remote manual control means of said remote control station, or more specifically a control console of said remote control station. Selecting said guided vehicle makes it possible to limit the piloting data communicated to the communication system of the remote control station to the piloting data specific to the guided vehicle selected, and also guarantees a transfer of said piloting data from the remote control station to the remote piloting module of the guided vehicle selected, without the possibility of any confusion with another guided vehicle. Thus, the images coming from cameras on board a guided vehicle and received on the ground correspond to the guided vehicle selected and controlled. The piloting system according to the invention is also able to guarantee a probability of addressing errors in the messages sent or received of SIL 4. Safety integrity level (SIL) 4 is defined by standard IEC 61508 on the safety of critical systems. It requires a probability of dangerous failure per hour of between $10^{-8}$ and $10^{-9}$.

In particular, the remote piloting means of the remote piloting module according to the invention include at least one driving camera that is positionable as a function of a composition of the guided vehicle. Effectively, the position or placement of the driving cameras depends on the composition of the guided vehicle, the constraint being the need to always have a camera at the front of the guided vehicle. For a reversible guided vehicle, the piloting means according to the invention include in particular at least one driving camera at each end of the guided vehicle, while, for a non-reversible guided vehicle, the piloting means according to the invention include in particular at least one camera at the front of the guided vehicle. Furthermore, the piloting means include in particular storage means able to permanently store images coming from said driving and surveillance cameras in order to enable, advantageously, the development of specific events to be analyzed. The storage time of said images may in particular range from several seconds to several minutes.

Advantageously, the remote-control device and the remote manual control means of the remote control station are in particular able to create an environment dedicated to the remote driving of the guided vehicle, by implementing an arrangement of elements required for remote piloting that is liable to create a remote driving station similar to the on-board driving station, located at either end of the guided vehicle. For this purpose, the remote manual control means include in particular the following interfaces:

A control console for the guided vehicle including several devices, including a traction/brake lever, an emergency brake button and a set of commands required for remote driving, as described below. Activation of any of said devices of the control console can be transmitted, in real-time as piloting data, to the remote piloting module, in order to trigger a result identical to an activation from a control station located at one of the ends of the guided vehicle, Assisted-piloting means comprising in particular surveillance screens displaying the following:

An image of the transport track in front of the guided vehicle selected or controlled, An image of a signal beside the transport track, The speed of the guided vehicle, The states of the guided vehicle, An overview of the transport line of the guided vehicle, An image generated by the surveillance cameras inside the guided vehicle, a state of the communication of the piloting data, in particular characterizing the transmission thereof, a telephone point (12).

Furthermore, the image or images captured by the driving camera, or driving cameras, are able to reproduce the view of a guided-vehicle driver from the driving station thereof. The driving cameras according to the invention provide a view of the transport track of the guided vehicle over a distance ranging from several meters to at least 200 meters in front of the guided vehicle, for example to enable any intervention staff remotely piloting the guided vehicle to determine the need to use the emergency brake.

Advantageously, each image sent by the driving or surveillance cameras includes at least one location datum (train number and camera number) and date. The communication of piloting data according to the invention is performed in real time. Nonetheless, if there is a significant time lag (for example of around half a second) between the display of the image on a screen incorporated into the remote manual control means and the capture thereof, a malfunction detection module, which can advantageously be incorporated into the remote manual control means, is in particular able to warn intervention staff of said lag. Furthermore, problems transmitting the image captured by said cameras, causing a frozen image for example, can also be flagged by said malfunction detection module using a signal that can alert intervention staff, thereby advantageously allowing said intervention staff to take the appropriate measures, such as activating the emergency brake. In general, the remote-control means include in particular at least one module for detecting a malfunction of a display of an image that can warn intervention staff when said malfunction is detected.

The remote piloting means according to the invention are in particular able to transfer the manual commands available at the driving station of said guided vehicle to the remote control station such that the function thereof is in particular transferred to the control console of the remote manual control means, without diminishing the level of safety thereof. In other words, the functions of the manual controls of the normal piloting system of the guided vehicle can be transferred from the driving station of the guided vehicle to the remote control station of said guided vehicle by means in particular of said piloting data.

Furthermore, said piloting data include, in addition to data relating to operation of the manual commands available at the driving station of said guided vehicle, data relating to an image of the transport track, the internal and external environment, and the speed of the guided vehicle, as well as other data useful to the remote manual piloting of the guided vehicle, such as:

Image capture time,
Camera location,
Train speed,
State of train-state indicator lamps,
Audio data (microphone capturing the noise environment in front of the train),
Sensor data, such as data from an accelerometer.

Said piloting data may also include data correlated to other remote manual piloting commands, such as data able to command a focusing of a camera or an activation of a specific headlamp on the front of the guided vehicle. In particular, said piloting data include the data sent from the remote control station to said guided vehicle, such as data able to command the traction of the guided vehicle, the braking of the guided vehicle, verification of the doors of the guided vehicle, and audible or visual information intended for passengers on said guided vehicle. Said piloting data are thus able to send orders generated by the remote control station for the remote piloting module. Said data can also be encoded, for example by the on-board processing system and by the processing system of the remote control station, in order to prevent any intrusion liable to disturb remote piloting. The communication systems of the on-board remote control station of the remote piloting module can also send said data in packets, during limited transmission times, while guaranteeing a low loss of said piloting-data packets.

The specific-event management system according to the invention can in particular be dimensioned to take into account the time and distance required to stop the guided vehicle completely, in particular in the event of emergency braking. The dimensioning of the piloting system in particular takes into account a piloting-data processing and transmission time, an intervention-staff reaction time, a brake-command transmission time, and an emergency braking time. The time required to completely stop the guided vehicle conditions the maximum speed at which the guided vehicle can run in remote driving mode such as to obviate the risk of collision with an object or another guided vehicle. The safety of passengers and the performance of the guided vehicle depend on this time parameter.

In particular, if there is a driver on the guided vehicle, the time required to completely stop the guided vehicle is given by $T_{stop}=T1+T2+T3$, where T1 is the reaction time of the driver once he has detected an obstacle on the transport track, T2 is the time between the moment when the driver presses an emergency-braking button and application of a brake on the wheels of the guided vehicle, and T3 is the time between the start of the emergency braking and the guided vehicle coming to a complete stop. T3 depends in particular on the speed of the guided vehicle when braking starts and the maximum deceleration that can be applied to the guided vehicle during emergency braking. If the driver of the guided vehicle is not on board said vehicle, but intervention staff are piloting said vehicle remotely, the total stopping time of the remotely guided vehicle $T_{stop-remote}$ is equal to the stopping time $T_{stop}$ with driver plus a time T4 for transmitting the piloting data to the remote control station, and vice versa, and processing said piloting data. Some of the time T4 therefore corresponds to image processing (on-board the guided vehicle and at the remote control station) and to the transmission thereof, and another part of said time T4 corresponds to the transmission of a datum relating to piloting comprising a braking command, from the remote control station to the remote piloting module and the processing thereof.

Advantageously, the specific-event management system is able to retain identical stopping distances between the normal driving mode characterized by $T_{stop}$ and the remote driving mode characterized by $T_{stop-remote}$ by reducing the speed of the guided vehicle such that this latter is equal to $V_0-T4 \cdot a_{max}$, where $V_0$ is the speed of the guided vehicle in normal driving mode, and $a_{max}$ is the absolute value of the maximum deceleration of the guided vehicle during emergency braking.

Finally, an exemplary embodiment and application is provided using:

BRIEF DESCRIPTION OF THE DRAWING

FIG. 1 Exemplary embodiment according to the invention of a specific-event management system of a guided vehicle.

DESCRIPTION OF THE INVENTION

By way of example, FIG. 1 shows a specific-event management system 1 according to the invention. The management system 1 includes in particular at least one remote piloting module 2 that can be installed on board a guided vehicle 3 and a remote control station 4. The remote piloting module 2 includes in particular a switching system 21 of a driving mode of the guided vehicle 3 in order to remotely switch a normal driving mode that can be implemented by a normal piloting system (5) to a remote driving mode, and vice versa, an on-board communication system 22, an on-board piloting-data processing system 23 and remote piloting means 24 enabling the guided vehicle to be piloted in a remote driving mode. The switching system 21, the on-board communication system 22, the on-board piloting-data processing system 23 and the remote piloting means 24 are able firstly to cooperate with each other to enable the guided vehicle 3 to be piloted remotely, piloting being controlled manually from the remote control station 4, and secondly to be connected in particular to each other to enable transmission of piloting data. In particular, they can each be connected to an existing on-board communication network (7) of the guided vehicle (3).

The remote control station 4 includes a remote-control device 41 of the switching system 21, a communication system 42 able to communicate with the on-board communication system 22, a piloting-data processing system 43, and remote manual control means 44 able to control the remote piloting means 24. The remote-control device 41, the communication system 42, the piloting-data processing system 43 and the remote manual control means 44 firstly are able to cooperate with each other in order to enable said guided vehicle 3 to be operated manually and remotely from the control station, and secondly can be connected in particular to one another to enable transmission of piloting data.

In particular, they can each be connected to a ground communication network (6) of a transport line.

In particular, the on-board communication systems 22 and communication systems 42 are able to transmit piloting data between the remote piloting module 2 of the guided vehicle 3 and the remote control station 4 using an existing radio system of the guided vehicle. In particular, said existing radio system is able to establish a permanent communication channel between a ground equipment network (6) of a transport line and the equipment on board the guided vehicle, such as an on-board automatic pilot (PAE). Thus, communications between the remote piloting module 2 and the remote control station 4 can use said network which is advantageously able to communicate with a PCC into which said remote control station 4 can be integrated using different radio access points located along the transport line. Furthermore, the on-board communication system 22 and the on-board piloting-data processing system 23 can be connected to a communication network (7) connecting the on-board equipment of the guided vehicle.

In particular, the remote piloting means 24 include one or more driving cameras 241. Each driving camera 241 can display the transport track and a signal (8) beside said transport track (9) of the guided vehicle. In particular, said driving camera 241 can have a variable and movable focus. Furthermore, the remote piloting means 24 can also include one or more surveillance cameras inside the guided vehicle that are able to monitor in particular the passengers of the guided vehicle, or the operation of a device of the guided vehicle, such as the operation of a door of said guided vehicle. In particular, the doors of said guided vehicle can be monitored using surveillance cameras arranged inside or outside the guided vehicle.

An on-board piloting-data processing system 23, said piloting data being for example generated by sensors that can be fitted to the remote piloting means 24, can be connected to the network (7) of the guided vehicle using an IT network communication protocol, i.e. via an Internet protocol (IP) link. The on-board piloting-data processing system 23 is in particular able to:

process images generated by the driving and surveillance cameras 241, process the piloting data generated by a rangefinder 242 able to measure distances and included in the remote piloting means 24, as well as piloting data coming from any other sensors fitted to the remote piloting means 24, process speed data, format piloting data for transmission thereof, in particular to the remote control station 4, process piloting data coming from the remote control station 4 and transmit any commands generated by processing said piloting data from the remote control station 4 to the remote piloting means 24 or to the switching system 21. The processing of said piloting data generated by the remote control station 4 can for example trigger a transmission of a signal able to command the focusing and orientation of a camera, or command other devices of the remote piloting means 24, store video images for a given time, manage short-loop obstacle detection.

Furthermore, the remote piloting means 24 may in particular include an optical dynamization and identification module (MODI) 243 specific to the remote piloting of said guided vehicle. The MODI 243 is able to:

compare the times at which a video image is captured using a driving camera 241 or a surveillance camera with the time at which said image is displayed on a screen of the assisted-piloting means 441 of the remote control station. Advantageously, the MODI 243 enables intervention staff to check a time lag between the display of piloting data and the collection thereof by the remote piloting module 2. The MODI 243 is also able to measure the elapsed time between activation of a test command of the remote manual control means 44 on the remote control station 4 and the display of the effect thereof on the screen of the assisted-piloting means 441. The MODI 243 is therefore able to test the piloting-data processing chain between the remote control station 4 and the remote piloting module 2.

check the origin of images taken by the surveillance or driving cameras 241 in particular by transmitting piloting data relating to the number of the camera and of the guided vehicle.

The MODI 243 is therefore able to guarantee the accuracy of a correspondence between images acquired by the cameras of a remotely controlled guided vehicle and the images sent to the remote control station 4.

The remote piloting means 2 may in particular include a set of intercoms used to transmit a two-way voice communication between passengers in the guided vehicle and the remote control station 4. Advantageously, said intercom set can be used as an intercom and a public address system on the guided vehicle 3, providing public address services for the guided vehicle, intercom dialogue and discreet listening on the guided vehicle, advantageously supplementing video information provided by the passenger surveillance cameras. In particular, intercoms may be installed in each of the carriages in a train. They enable communication between intervention staff at the remote control station 4 and passengers. The type of communication is for example a full-duplex link between the remote control station 4 and the guided vehicle, or a particular train, in particular following a call from the remote control station 4 or from the guided vehicle or from the train. The remote manual control means also make it possible to set at least one loudspeaker on the guided vehicle to discreet listening.

Advantageously, said remote piloting means 24 may include a distance sensor or rangefinder 242 intended to be placed at the front of the guided vehicle. Said distance sensor or rangefinder 242 enables the rapid measurement of the distance between the guided vehicle 3 and an obstacle on the transport track. This distance sensor or rangefinder 242 may be connected to a short loop inside the guided vehicle intended to trigger emergency braking if an obstacle is present, like a rail guard. Said short loop advantageously enables a rapid reaction of the train in response to imminent danger regardless of any delays caused by communications between the remote piloting module 2 and the remote control station 4.

The remote manual control means 44 of the remote control station 4 may in particular include a control console 442 including in particular:

A button for selecting the driving mode that is able to send a command to the remote-control device 41 to switch the driving mode that is intended to be sent to the switching system 21 of the remote piloting module 2, Driving levers for:

Traction or braking, having in particular three positions or continuous control, Opening at least one left-hand door of the guided vehicle, Opening at least one right-hand door of the guided vehicle, Closing at least one left-hand door of the guided vehicle, Closing at least one right-hand door of the guided vehicle,
Overriding safety loops of the guided vehicle,
A guided-vehicle selection device,
Levers for selecting cameras (front, rear, outside, inside, etc.) fitted to the remote piloting means 24 of the remote piloting module 2,
At least one lever acting on a camera enabling the images recorded or stored to be viewed, or enabling the camera to be zoomed or moved,
A windscreen-wiper activation/deactivation device,
A device for activating and deactivating the headlamps of the remotely operated guided vehicle.

The assisted-piloting means 441 include in particular at least one screen intended to display information useful for the remote piloting of the guided vehicle, in particular four screens respectively:
A first screen intended to display an overview of the transport line: the overview includes for example one or more summary images showing the whole of the transport line, including an automated part of a garage or a workshop used for maintaining or storing the guided vehicle:
The state of the transport-line PLCs,
The position of the guided vehicle, in particular the position and the formation of a train and information concerning a movement of the guided vehicle, in particular said trains,
A traction network,
A second screen intended to show images captured by a driving camera 241 installed on the front of the guided vehicle. Advantageously, said screen displays an image generated by the driving camera 241 located at the front of the guided vehicle selected, and it permits manual remote driving based on a visual reading by intervention staff of the image displayed on said second screen,
A third screen intended to display the status indicators of the guided vehicle and the speed of the guided vehicle,
A fourth screen intended to display images taken by one or more cameras on board the guided vehicle, in particular in trains and on the sides of the guided vehicle. These are for example images generated by surveillance cameras placed inside the guided vehicle, as well as images coming from cameras that can be fixed to the external or internal sides of the guided vehicle to monitor the doors of the guided vehicle.

The piloting-data processing system 43 is able to process the piloting data generated by the remote piloting module 2. It can in particular be connected to the communication network (6) between the guided vehicle and the ground via an IP connection. The piloting-data processing system 43 is in particular able to:
process the video images generated by the cameras of the remote piloting module 2,
analyze the content of said video images in order to extract and highlight specific elements when displaying said images. The highlighting of said specific elements advantageously allows intervention staff to be warned of the presence of said specific element. Said specific elements are for example a signal beside the transport track, equipment on said transport track, the presence of a platform and a station identification, the presence of another guided vehicle on the transport track, or more generally the presence of any unexpected object on the transport track,
process data generated by a rangefinder 242 and any other sensors included in the remote piloting means 24,
process guided-vehicle speed data,
manage a secure display of at least some of the piloting data on the screens of the assisted-piloting means 441,
store video images and piloting data generated by the guided vehicle during a usage period of the guided vehicle in remote driving mode.

The piloting data include in particular safety data and functional data that may be passed between the guided vehicle and the remote control station. The safety-related piloting data coming from the guided vehicle, and in particular from the remote piloting module 2, include information relating to:
A driving mode,
A PLC status,
A rolling stock status,
An alarm signal,
Closing and locking of a door, for example the left-hand and/or right-hand doors of the guided vehicle,
Departure authorization.

The safety-related piloting data coming from the remote control station 4 and sent to the remote piloting module 2 of the guided vehicle include information relating to:
Emergency braking,
Traction or braking,
Opening and/or closing a door, for example opening the right-hand doors, opening the left-hand doors, closing the right-hand doors, or closing the left-hand doors of the guided vehicle,
Overriding safety loops.

The functional piloting data coming from the remote control station 4 and sent to the remote piloting module 2 of the guided vehicle include information relating to:
A switching of the driving mode of the guided vehicle, generated by the remote switching device 41. In particular, switching to remote driving mode is able to start said guided vehicle remotely. Thus, switching the driving mode of the guided vehicle is in particular able to command the guided vehicle to be powered up. Advantageously, a driving mode of the switching system (21) corresponds to a powering down of the guided vehicle, such that the powering up or the powering down of the guided vehicle can be commanded remotely from the remote piloting station (4). Furthermore, and in particular, at least one driving mode selectable by the switching system (21) by switching the driving mode can reset the equipment of the guided vehicle, In addition to the aforementioned piloting data, the piloting data may include data specific to remote piloting, i.e. the remote driving mode, which may be sent from the guided vehicle to the remote control station 4. These are for example piloting data specific to:
An image of the transport track and a signal on said transport track,
A speed of the guided vehicle,
An image generated by a surveillance camera of the train,
An identification number of the remotely pilotable guided vehicle and of at least one of the active cameras thereof,
An audio channel from the remotely guided vehicle and images generated by door and passenger surveillance cameras.

Therefore, the present invention enables a guided vehicle to be piloted manually and remotely in the event of detection of a specific event such as a failure of the automatic pilot (10) of an automatic guided vehicle or a maneuver of said automatic guided vehicle on a route not suited to the PLC devices thereof. In particular, in the event of detection of a specific event, said detection may be sent by the guided vehicle to the remote control station (4). The intervention staff (11) manning said remote control station can then select the guided vehicle to be piloted remotely, and command, using the remote-control device (41), a switching from the normal driving mode to a remote driving mode. The normal driving mode, for example an automatic driving mode of the guided vehicle requiring no driver on board said guided vehicle and implemented by an automatic piloting system comprising in particular an on-board automatic pilot, is then replaced by a remote manual driving mode, i.e. the remote driving mode managed remotely by said intervention staff. As the remote piloting module is able firstly to remotely deploy all of the functions of the driving station on board the guided vehicle to the remote control station, and secondly to send piloting data to the remote control station enabling the remote piloting of said guided vehicle, intervention staff are then able to remotely pilot said guided vehicle. Finally and advantageously, the remote-control device can command a switching of the switching system from a remote driving mode to a normal driving mode so that, for example, the automatic pilot of a guided vehicle can again take charge of piloting of the automatic guided vehicle.

In short, the method and the system for managing a specific event, as well as the remote piloting module and the remote control station according to the invention have several advantages in relation to existing methods and devices, which require the intervention of intervention staff at the site of a specific event. Effectively, the method and the system for managing a specific event enable:

- non-reliance on the intervention of intervention staff on board the guided vehicle at the site where a specific event occurs,
- remote-control of an approach of an automatic or non-automatic guided vehicle: indeed, distance sensors, for example at least one laser range finder or a variation of the focusing of a driving camera enable in particular an approach controllable from the remote control station, independent of an automatic approach procedure that is disadvantageously slow, due to an approach phase requiring a very slow speed of the guided vehicle,
- remote driving instead of on-board manual driving of the guided vehicle in response to a specific event, for example in the event of an operational incident,
- time and staff savings: indeed, the intervention time in the event of a failure requiring the vehicle to be switched to manual driving mode is significantly decreased. Indeed, intervention staff are no longer required to go to the site where the guided vehicle has broken down. This also helps to prevent knock-on incidents that may be caused by passenger impatience (alighting onto the track) and to improve the flow of traffic on the line,
- a transport line of an automatic guided vehicle to be inspected at the beginning of the service (such as the beginning of the day) to guarantee the safety and functionality of the transport line and of the guided vehicle,
- the automatic guided vehicle to be moved on part of the transport line on which an automatic driving mode is not or is no longer possible.
- the formation of remotely controlled trains in stabling, parking and terminus zones, or in dedicated zones,
- trains in stabling, parking, terminus and dedicated zones to be divided manually and remotely,
- the remote stabling of an automatic guided vehicle if the stabling zones are not automated,
- guided vehicles to be made available to the workshop by controlling them remotely,
- independent remote supervision of the transport line, whether it includes covered zones (tunnels, sheds) or uncovered zones,
- independent remote supervision of the light state around the guided vehicle, regardless of the weather (rain, snow, fog),
- a re-creation of the driving environment (view of the track and the environment thereof, view and noise environment of the inside of the train, commands available for manual driving, alarms or surveillance available for manual driving) of the guided vehicle to be transferred to the remote control station,
- removal of redundant on-board automatic pilot: indeed, an automatic guided vehicle usually has two on-board automatic pilots as a contingency for a failure of one of the two on-board automatic pilots. In the event of failure of the active automatic on-board pilot, the second automatic on-board pilot takes over in order to handle the automatic movement of the guided vehicle. The present invention makes such redundancy unnecessary. Indeed, in the event of failure, the automatic guided vehicle is driven by intervention staff from the remote control station. The intervention staff can then drive the guided vehicle to the next station or until a driver boards. At the end of the line, the remote control station is able to move the guided vehicle to a maintenance workshop for replacement of the faulty automatic pilot,
- a reduction in the costs related to a transport line by removing, for example, redundant automatic pilots or workshop zone PLC equipment, the movement of the guided vehicle being remotely controllable by intervention staff.

The invention claimed is:

1. A method for managing specific events, which comprises the steps of:
   detecting at least one specific event that could disturb a movement of a driverless automatically guided vehicle;
   performing a remotely controlled reversible switching from a normal driving mode to a remote driving mode of the driverless automatically guided vehicle following a detection of the specific event, the switching being remotely controlled by a remote-controlled device capable of performing a remote switching from the remote driving mode to the normal driving mode, wherein the normal driving mode is a driverless automatic driving mode without a driver on board the driverless automatically guided vehicle and the remote-controlled device is disposed offsite from the driverless automatically guided vehicle;
   measuring in real-time and collecting of piloting data in the remote driving mode;
   communicating in real-time of the piloting data between a remote piloting module of the driverless automatically guided vehicle and a remote control station;
   processing in real-time the piloting data; and
   performing in real-time a manual and remote piloting of the driverless automatically guided vehicle in the remote driving mode, on a basis of the piloting data, wherein for retaining identical stopping distances between the normal driving mode and the remote driving mode, a speed of the driverless automatically guided vehicle in the remote driving mode is equal to $V_0 - T4 \cdot a_{max}$, where $V_0$ is the speed of the driverless automatically guided vehicle in the normal driving mode, $a_{max}$ is an absolute value of a maximum deceleration of the driverless automatically guided vehicle during emergency braking, and T4 is a time for transmitting the piloting data to the remote control station.

2. A remote piloting module for a driverless automatically guided vehicle and installable on board the guided vehicle, the guided vehicle having a normal piloting system for piloting the guided vehicle, the remote piloting module configured for cooperating with the normal piloting system of the guided vehicle, the remote piloting module comprising:

a switching system for switching a driving mode of the guided vehicle and being remotely controlled by a remote control station disposed offsite from the driverless automatically guided vehicle, for remotely switching from a normal driving mode to a remote driving mode, and vice versa, the switching being remotely controlled by the remote control station capable of performing a remote switching from the remote driving mode to the normal driving mode by sending a signal marking an end of a specific event causing the remote driving mode, wherein the normal driving mode is a driverless automatic driving mode without a driver on board the guided vehicle;

an on-board communication system for communicating between the guided vehicle and the remote control station, said on-board communication system exchanging piloting data in the remote driving mode with a communication system of the remote control station;

an on-board system for processing the piloting data to enable a remote manual piloting of the guided vehicle in the remote driving mode;

a remote pilot for remotely piloting the guided vehicle, the guided vehicle being controlled manually via control means of the remote control station in the remote driving mode; and the remote piloting module programmed to maintain identical stopping distances between the normal driving mode and the remote driving mode, a speed of the guided vehicle in the remote driving mode is equal to $V_0-T4 \cdot a_{max}$, where $V_0$ is the speed of the guided vehicle in the normal driving mode, $a_{max}$ is an absolute value of a maximum deceleration of the guided vehicle during emergency braking, and T4 is a time for transmitting the piloting data to the remote control station.

3. The remote piloting module according to claim 2, wherein said remote pilot can measure and collect the piloting data.

4. The remote piloting module according to claim 2, wherein said remote pilot has devices for measuring and collecting the piloting data.

5. The remote piloting module according to claim 2, wherein said remote pilot includes a driving camera positionable at each end of the guided vehicle.

6. The remote piloting module according to claim 2, wherein said remote pilot includes a surveillance camera that can enable monitoring of an environment of the guided vehicle.

7. The remote piloting module according to claim 2, wherein said remote pilot includes a rangefinder.

8. A remote control station for use with a remote piloting module of a driverless automatically guided vehicle, the driverless automatically guided vehicle having a normal piloting system, the remote control station remotely controlling a piloting of the driverless automatically guided vehicle using the remote piloting module, the remote control station comprising:

a remote-control device of a switching system of the remote piloting module, the switching system being able to switch from a normal driving mode to a remote driving mode and vice versa, following a command issued from said remote-control device, wherein the normal driving mode is a driverless automatic driving mode without a driver on board the driverless automatically guided vehicle;

a communication system for communicating between the driverless automatically guided vehicle and the remote control station, said communication system exchanging piloting data in the remote driving mode with an on-board communication system of the remote piloting module of said driverless automatically guided vehicle;

a system for processing the piloting data of the driverless automatically guided vehicle that can process the piloting data;

a remote manual controller for controlling a remote pilot of the remote piloting module of the driverless automatically guided vehicle in the remote driving mode, said remote-control device, said communication system, said system and said remote manual controller are all disposed offsite from the driverless automatically guided vehicle; and the remote control station being programmed to maintain identical stopping distances between the normal driving mode and the remote driving mode, a speed of the guided vehicle in the remote driving mode is equal to $V_0-T4 \cdot a_{max}$ where $V_0$ is the speed of the guided vehicle in the normal driving mode, $a_{max}$ is an absolute value of a maximum deceleration of the guided vehicle during emergency braking, and T4 is a time for transmitting the piloting data to the remote control station.

9. The remote control station according to claim 8, further comprising assisted-piloting means connected to said remote manual controller.

10. The remote control station according to claim 8, further comprising a control console connected to said remote manual controller.

11. The remote control station according to claim 8, wherein said remote manual controller includes a guided-vehicle selection device.

12. A specific-event management system for remote piloting of a driverless automatically guided vehicle having a normal piloting system for piloting the driverless automatically guided vehicle, the specific-event management system comprising:

a remote control station having a communication system and a control means said remote control station disposed offsite from the driverless automatically guided vehicle;

a remote piloting module installed on board the driverless automatically guided vehicle, said remote piloting module configured for cooperating with the normal piloting system of the driverless automatically guided vehicle, said remote piloting module containing:

a switching system for switching a driving mode of the driverless automatically guided vehicle and being remotely controlled by said remote control station, for remotely switching from a normal driving mode to a remote driving mode, and vice versa, wherein the normal driving mode is a driverless automatic driving mode without a driver on board the automatically guided vehicle;

an on-board communication system for communicating between the guided vehicle and said remote control station, said on-board communication system exchanging piloting data in the remote driving mode with said communication system of said remote control station;

an on-board system for processing the piloting data to enable the remote manual piloting of the driverless automatically guided vehicle in the remote driving mode;

a remote pilot for remotely piloting the driverless automatically guided vehicle, the driverless automatically guided vehicle being controlled manually via said control means of said remote control station in the remote driving mode;

said remote control station remotely controlling a piloting of the driverless automatically guided vehicle using said remote piloting module, said remote control station containing:

a remote-control device for communicating with said switching system of said remote piloting module, said switching system being able to switch from the normal driving mode to the remote driving mode and vice versa, following a command issued from said remote-control device;

said communication system for communicating between the driverless automatically guided vehicle and said remote control station, said communication system exchanging the piloting data in the remote driving mode with said on-board communication system of said remote piloting module of the guided vehicle;

an on-board piloting-data processing system for processing the piloting data of the driverless automatically guided vehicle; and a remote manual controller for controlling said remote pilot said remote piloting module of the driverless automatically guided vehicle in the remote driving mode; and the specific-event management system programmed to maintain identical stopping distances between the normal driving mode and the remote driving mode, a speed of the guided vehicle in the remote driving mode is equal to $V_0 - T4 \cdot a_{max}$, where $V_0$ is the speed of the guided vehicle in the normal driving mode, $a_{max}$ is an absolute value of a maximum deceleration of the guided vehicle during emergency braking, and T4 is a time for transmitting the piloting data to said remote control station.

13. The specific-event management system according to claim 12, wherein the piloting data includes information, commands and parameters relating to an operation, piloting and an external and internal environment of the driverless automatically guided vehicle.

14. The specific-event management system according to claim 12, wherein said remote control station has a piloting-data processing system for connecting to a communication network between the driverless automatically guided vehicle and the ground using an IP link.

15. The specific-event management system according to claim 12, wherein said on-board piloting-data processing system can be connected to a network of the driverless automatically guided vehicle using an IP link.

* * * * *